United States Patent [19]

Ragavan et al.

[11] Patent Number: 4,811,394
[45] Date of Patent: Mar. 7, 1989

[54] VARIABLE STARTING STATE SCRAMBLING CIRCUIT

[75] Inventors: Vivek Ragavan, Germantown, Md.; William H. Wolfe, Burke, Va.

[73] Assignee: Communications Satellite Corporation, Washington, D.C.

[21] Appl. No.: 122,642

[22] Filed: Nov. 10, 1987

Related U.S. Application Data

[63] Continuation of Ser. No. 881,485, Jul. 1, 1986, abandoned, which is a continuation of Ser. No. 402,702, Jul. 28, 1982, abandoned.

[51] Int. Cl.[4] .............................................. H04L 9/00
[52] U.S. Cl. ........................................ 380/21; 380/34; 380/46
[58] Field of Search ..................... 380/1, 9, 46, 47, 48, 380/49, 50; 375/2.1, 2.2; 455/26; 364/717

[56] References Cited

U.S. PATENT DOCUMENTS

| | | | |
|---|---|---|---|
| 3,291,808 | 12/1966 | Ehrat | 178/22.16 |
| 3,614,316 | 10/1971 | Andrews et al. | 178/22.17 X |
| 3,659,046 | 4/1972 | Angeleri et al. | 178/22.17 X |
| 3,866,217 | 2/1975 | Bennett, Jr. | 178/22.17 X |
| 4,047,008 | 9/1977 | Perkins | 364/717 |
| 4,109,856 | 8/1978 | Van Beveren et al. | 178/22.17 X |
| 4,145,508 | 3/1979 | Ehrat | 178/22.16 |
| 4,171,513 | 10/1979 | Otey et al. | 178/22.17 X |
| 4,172,963 | 10/1979 | Belcher et al. | 179/1.5 R X |
| 4,176,246 | 11/1979 | Gaetzi | 178/22.17 X |
| 4,264,781 | 8/1981 | Oosterbaan et al. | 364/717 X |
| 4,304,962 | 12/1981 | Fracassi et al. | 178/22.19 X |
| 4,329,545 | 5/1982 | Westermayer | 178/22.7 |
| 4,341,925 | 7/1982 | Doland | 364/717 X |
| 4,434,322 | 2/1984 | Ferrell | 455/26 X |
| 4,484,027 | 11/1984 | Lee et al. | 178/22.13 |
| 4,493,046 | 1/1985 | Watanabe | 364/717 |

OTHER PUBLICATIONS

Carl H. Meyer and Stephen M. Matyas, Generation, Distribution, and Installation of *Cryptographic Keys*, Chapt. 6, Cryptography: A New Dimension in Computer Data Security, IBM Corp., N.Y., pp. 300, 316, 317, 1978, 1982.

*Primary Examiner*—Brian S. Steinberger
*Attorney, Agent, or Firm*—Sughrue, Mion, Zinn, Macpeak, and Seas

[57] ABSTRACT

PN sequence generators used in the scrambling and descrambling circuits at remote locations are periodically preset to the same value in order to maintain synchronism, with the preset value being also periodically changed. The preset value can be transmitted to the scrambling and descrambling circuits over a privacy channel once per frame and stored in storage registers associated with each of the scrambling and descrambling circuits. The stored starting state values can be loaded into the PN sequence generators as often is desired to maintain proper synchronization, with the stored values themselves being changed at a rate in accordance with the desired degree of security.

9 Claims, 3 Drawing Sheets

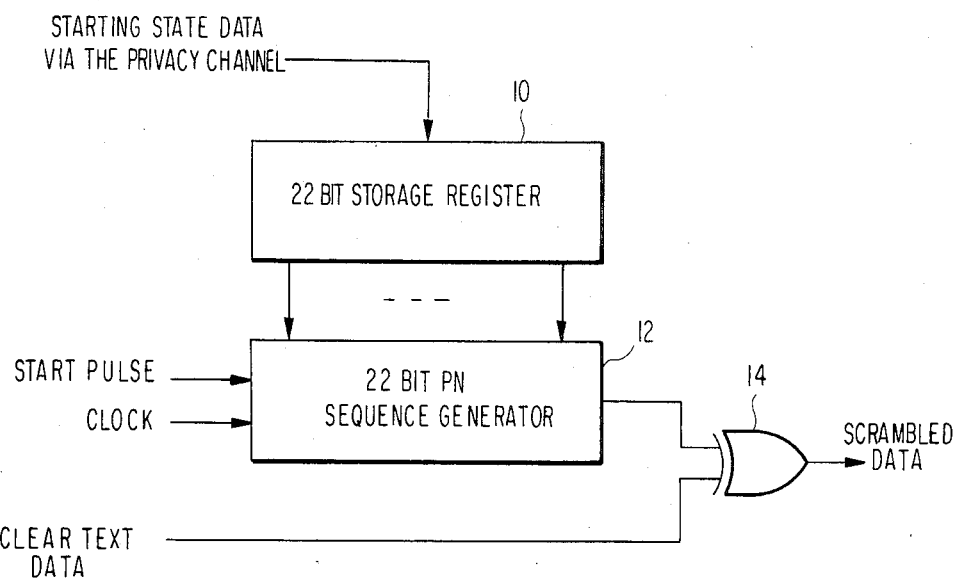
FIG. 1     SCRAMBLER CIRCUIT
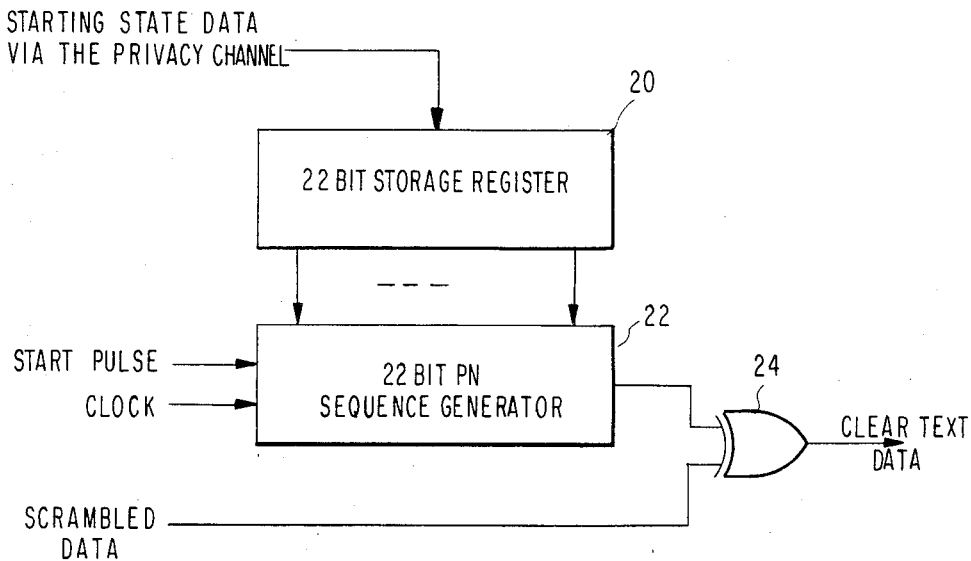
FIG. 2     DESCRAMBLER CIRCUIT

VARIABLE STARTING STATE SCRAMBLING CIRCUIT

This is a continuation of application Ser. No. 881,485 filed 7-1-86, which is a continuation of application Ser. No. 402,702, filed 7-28-82.

BACKGROUND OF THE INVENTION

The present invention generally concerns communications security and is more particularly directed to a scrambling circuit capable of providing satisfactory security in a high bit rate TDMA communications system.

In conventional TDMA systems where data security is desired, data encryption equipment has been placed at the data source with decryption equipment used at the receiver. For data rates of 64 kilobits or less, encryption is possible using commercial encryption equipment operating in a well known manner in accordance with the National Bureau of Standards (NBS) Data Encryption Standard (DES). However, even at such a relatively low bit rate, some situations involve a large number of 64 kilobit data streams each of which must be encrypted, thus requiring a large number of encryption devices and increasing system costs and complexity.

Until recently, data security in TDMA systems has not been a widespread concern and the few applications in which it has been necessary may have justified its expense and attendant performance limitations. However, with increasingly widespread use of TDMA communications, for example in the commercial marketplace where sensitive data such as bank transfer information and petroleum exploratory data is being transmitted via TDMA links, the need to provide data security is becoming increasingly important. Users of TDMA systems now desire to have the TDMA transmission bulk encrypted in accordance with the National Bureau of Standards DES, but for domestic TDMA systems this may necessitate a set of hardware to encrypt data at either 30 or 60 megabits. Such equipment is not readily available.

Rather than utilize encryption equipment, a measure of security can be provided by scrambling the TDMA transmission. A common scrambling technique is to generate a psuedo-random (PN) number sequence and to mix this sequence with the data bit stream, e.g. via an Exclusive OR gate. The scrambled data is then modulated and transmitted with energy that is substantially equally distributed across the bandwidth of the transmission channel. A descrambler utilizing an identical PN sequence generator is located at the receiver and utilizes an identical PN sequence to extract the information data. In order to accurately extract the information, however, the PN sequence generators at the data source and receiver must be operated in synchronism, and this is assured by periodically resetting both of the PN sequence generators to a known state. In typical TDMA systems, the PN sequence generators are loaded with an all ones pattern at the beginning of a sequence, with the sequence being started either at the beginning of a TDMA frame and running continuously for the duration of the frame or at the beginning of each burst and running for the duration of each burst.

While such scrambling techniques do provide a measure of security, the protection provided is not sufficient for sensitive information. An unauthorized user with the same receiver hardware can reset his own PN sequence generator to enable decryption of the data. Even if he does not know from the start the value to which the sequence generator should be reset each time, if the reset value is always the same he need only collect enough data to break the code once, after which he will have no trouble in thereafter receiving and descrambling all transmitted information.

A slight improvement in security is provided by a system such as disclosed in U.S. Pat. No. 3,659,046 to Angeleri et al. In that system, the PN sequence generators in the transmitter and receiver are concurrently reset in order to maintain synchronization, but the resetting is performed in response to a randomly gnerated pulse at the transmitter. Thus, an unauthorized user, even knowing the starting state to which the scrambler is to be reset, would have the additional problem of determining exactly at what times the resetting is to occur. Although this does provide an additional measure of security, the system would not be protected from an unauthorized user having the same receiver hardware. Such an unauthorized user would have his own PN sequence generator reset at the proper times by merely detecting the reset pulse.

SUMMARY OF THE INVENTION

It is an object of this invention to provide a scrambling/descrambling technique which is relatively secure even from an unauthorized user having the same receiver hardware.

Briefly, the present invention comprises a method and apparatus by which the PN sequence generators in the transmitter and receiver are periodically set to identical but variable starting states. A starting state value to be used at the transmitter as an initial scrambling sequence value is transmitted over a privacy channel to the receiver so that the receiver knows the same starting state used at the transmitter. In a preferred embodiment of the invention, the transmitter and receiver each include multibit storage registers for storing a particular such value. The contents of this register can be periodically changed, and setting of the PN sequence generators at the scrambler and descrambler is performed by loading the stored initial scrambling sequence value into the PN sequence generator in response to a start, or load, pulse which can be generated and transmitted in a conventional manner. The initial scrambling sequence value, which is generated at the transmitter, can be transmitted to the receiver over a privacy channel and can be preferably encrypted in accordance with the well known DES.

BRIEF DESCRIPTION OF THE DRAWINGS

The invention will be more clearly understood from the following description in conjunction with the accompanying drawings, in which:

FIG. 1 is a block diagram of the essential components of a scrambler circuit arrangement according to the present invention;

FIG. 2 is a block diagram of the essential components of a descrambler circuit arrangement according to the present invention;

DETAILED DESCRIPTION OF THE INVENTION

The invention will be described in the context of a TDMA system of the type having a centrally controlled network with a Network Control Processor (NCP) at the reference terminal providing all command information required to define the TDMA frame structure. However, it should be appreciated that in its most basic form the invention is applicable to scrambled transmissions between any two stations.

As described above, it is common in a TDMA system to scramble the data using a PN sequence generator, with the PN sequence generators at the transmitter and receiver being practically reset. The resetting may occur once every frame or once every burst, or it may even occur at random intervals as in the above-cited U.S. Pat. No. 3,659,046 to Angeleri et al. The present invention is applicable to any and all of the these systems regardless of the frequency with which the sequence generator is to be restarted. In its most basic form, the invention is directed to a technique for adjusting the value at which the scrambler and descrambler PN sequence generators will be restarted.

Figure 3:
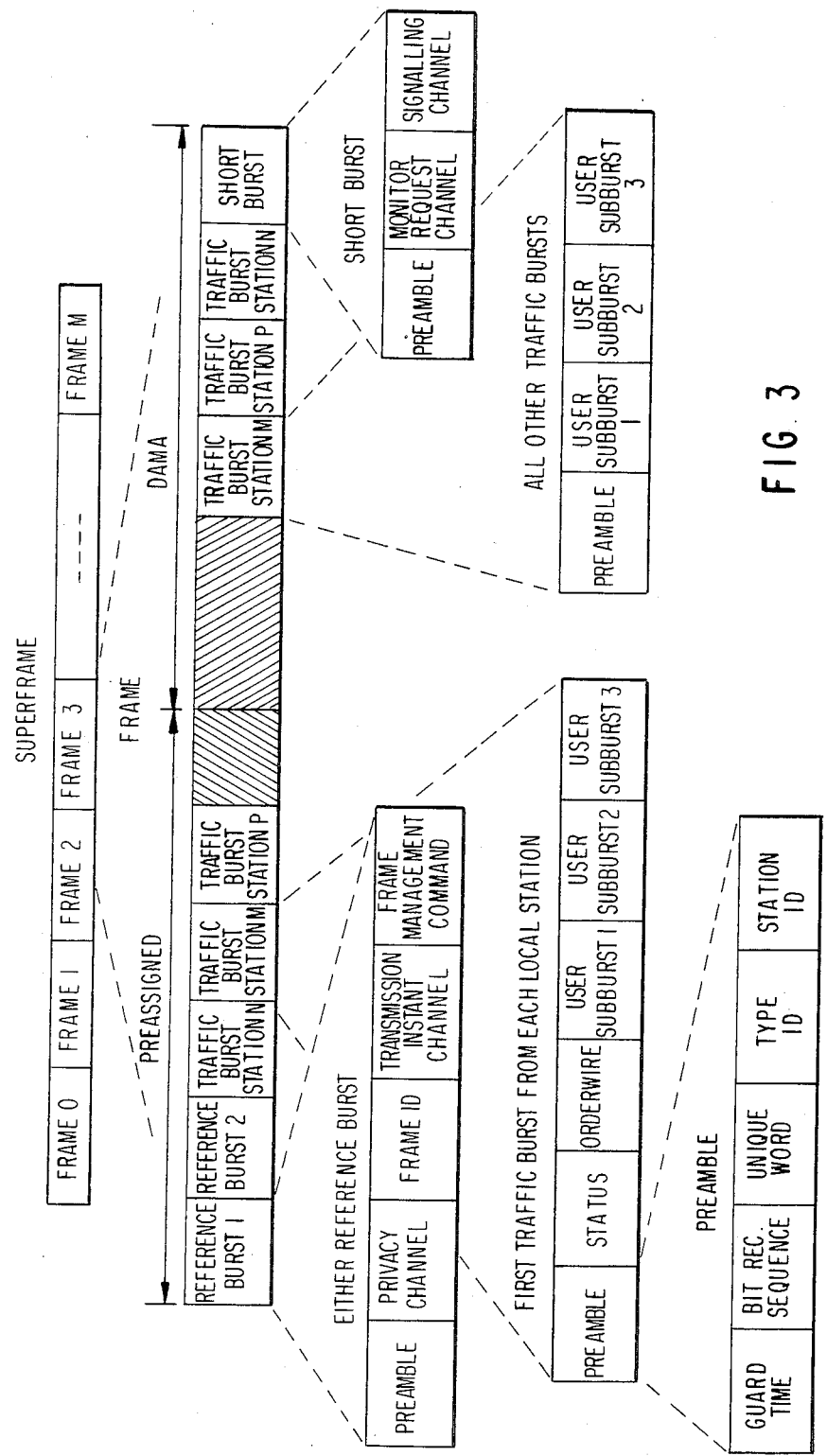
FIG. 3 is a diagram of TDMA frame architecture showing the location of the privacy channel in which the starting state is to be transmitted.
Figure 4:
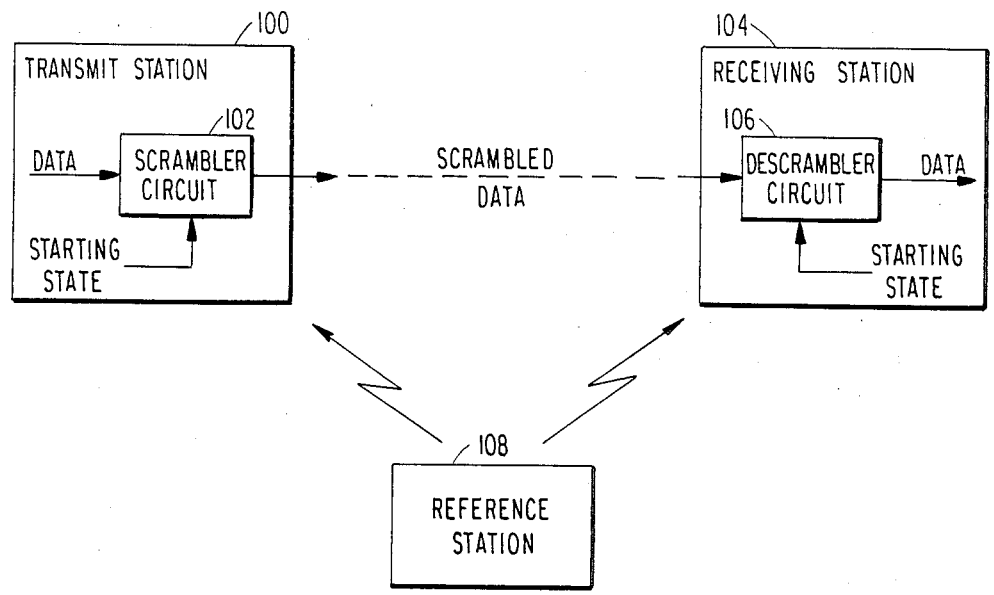
FIG. 4 is a general diagram of the communications system in which the invention is to be utilized.

FIG. 4 shows the general configuration of a typical TDMA satellite communications system that forms the environment for the illustrative embodiment of the invention. As is well known, such a system comprises one or more reference stations 101, 102 and local or traffic stations 105, 106. The reference station(s) 101, 102 each transmit reference bursts 201, 202 and each local or traffic station transmits its own traffic or data bursts 205 to 209; each reference and traffic station receives all reference and data bursts. These bursts are shown along a timeline indicating the time of receipt in the satellite transponder. FIG. 4 shows (indicated by arrows) the transmission and reception relationships for the various bursts in the TDMA system. The constituent portions of the TDMA frame and the bursts shown in FIG. 4 will be explained with greater particularity herein regarding FIG. 3.

FIG. 5 illustrates a typical relevant portion of a reference TDMA terminal. The circuit illustrated in FIG. 5 provides the content of the privacy channel identified in FIG. 3, which in the preferred embodiment of the invention described herein includes the updated or new initial scrambling sequence value transmitted to each scrambling/descrambling circuit. The new initial scrambling sequence value in the preferred embodiment is generated at the reference terminals frame management processor 301 (shown including a central processing unit 306). This is done by generating a variable number, typically by a random number generator 302 in processor 301, then encrypting it with a key from a ROM 303, and passing it through a conventional data security device 304. The initial scrambling sequence value, thus encrypted, is transferred via the reference terminal system data bus 401 to the a portion of the 501 memory bank of the signalling and coding module 601 dedicated to the privacy channel in the typical TDMA reference terminal. From there, under the control of the CPU 306 in the well-known manner, contents of the bank 501 are transmitted to the modem and RF stages of the reference terminal for transmission at the proper time to the satellite in accordance with the frame configuration shown in FIG. 3.

FIG. 6 shows the relevant portion of a typical TDMA local or traffic terminal. In a typical such terminal a Modem Interface 701 receives from the traffic terminal's modem demodulated received reference bursts (201) and data bursts (205 . . . 209), and separates privacy channel information, which is routed to privacy channel portion 802 of a memory unit 801. The standard local terminal, analogous to the described operation of the reference station, employs a frame management processor, 1001 comprised of CPU 1002, and identical Key ROM 1003 and data security device 1004. Processor 1001 decrypts the receive intial scrambling state value in a manner analogous to the encryption of this value in processor 301 previously described in the reference terminal. The decrypted intial starting state values are provided to Modem Interface 701 and are identically supplied to the scrambler/descrambler circuits of the invention illustrated in FIGS. 1 and 2 further described herein. In Interface 701 scrambled received data is descrambled by descrambler circuit 704 and data to be transmitted is scrambled by scrambler circuit 703. For purposes of terrestrial interfacing, the traffic data to be scrambled is first transformed in a parallel to series converter 705 and descrambled traffic data is oppositely transformed in series to parallel converter 706.

FIG. 1 is a brief block diagram of the essential components of a scrambler circuit according to the present invention, and FIG. 2 is a similar block diagram of a descrambler circuit. In the scrambler circuit of FIG. 1, a storage register 10, which may for example comprise a 22-bit storage register, stores the initial scrambling sequence value which is then loaded into a 22-bit PN sequence generator 12 in response to a start pulse. Having been loaded with this value, the sequence generator then proceeds to generate its PN sequence in response to a clock signal, with the PN sequence being combined with clear text data in an Exclusive OR (EOR) gate 14. In the descrambler circuit of FIG. 2, a similar 22-bit storage register 20 stores a initial scrambling sequence value which is loaded into an identical 22-bit PN sequence generator 22 in response to a start pulse, and the PN sequence output from the sequence generator 22 is combined with the scrambled data in EOR gate 24 to recover the clear text data.

The generation of the start and clock pulses and the scrambling and unscrambling of the data via EOR gates are conventional and well known and need not be described in further detail. Further, the operation of PN sequence generators is also well understood in the art and the sequence generator itself may operate according to any of a number of well known algorithms. The distinctive feature of the present invention is that, whereas in a conventional system the PN sequence generators 12 and 22 would be reset to fixed starting states in response to the start pulses, the present invention provides registers 10 and 20 for storing a variable initial scrambling sequence value and the sequence generators according to the present invention are instead set not to fixed values but to the values stored in respective storage registers 10 and 20, which storage values may be periodically changed.

For the purposes of this description, as stated above, the invention is assumed to be utilized in a centrally controlled TDMA network having a plurality of stations including at least one reference terminal. Thus, as shown in FIG. 4, a transmit station 100 will include a scrambler circuit 102 which will be configured as shown in FIG. 1, and a receiving station 104 will include a descramber circuit 106 which will be configured as shown in FIG. 2. A reference terminal 108 may transmit various control information to the transmitting and receiving stations, including the updated starting state values. It should be noted that, in a typical system, any station can alternately act as either a transmit or receiving station, so that all stations will have each of a scrambler and descrambler circuit, although only one such circuit is illustrated in each of the transmit and receiving stations 100 and 104, respectively, for simplicity in FIG. 4. In such a case, the 22-bit number to be stored in the registers 10 and 20 at each terminal is preferably transmitted from the NCP to each local terminal in the network. The 22-bit number is then loaded into the PN sequence generators in each circuit when that circuit is initialized at the beginning of a TDMA frame, at the beginning of a TDMA burst, or randomly as may be desired. For an unauthorized user to correctly receive the information, he must load his own PN sequence generator with the same 22-bit number at the same time. There are $2^{22}$, or more than 4 million, different numbers which could be used to start the scrambling and descrambling processes, and the unauthorized user must not only determine the particular number which will correctly start his descrambler but must also make this determination as often as the contents of the registers 10 and 20 are changed. This will present at least a substantial obstacle to unauthorized interception of the transmission.

The 22-bit number to be stored in the registers 10 and 20 may preferably be transmitted from the NCP in the privacy channel. FIG. 3 is a diagram of the TDMA frame architecture showing the privacy channel transmitted in reference burst 1 immediately following the preamble. In order for each of the local terminals to receive the privacy channel, the privacy channel is transmitted with the scrambling circuits disabled. This does present a problem in that unauthorized users will also be listening to the privacy channel, and some means is therefore needed to secure the privacy channel from unauthorized reception. This may be done by encrypting the privacy channel using the National Bureau of Standards data encryption standard. The TDMA system in which the present invention is used my utilize the electronic code book mode as described in Federal Standard 1026, and this mode may be implemented using either a master key only or a master key plus secondary key to decrypt the privacy channel. This type of encryption/decryption is well understood in the art and need not be described in detail here but has been generally shown and described with respect to FIGS. 5 and 6. Further, it should be noted that, although the electronic code book mode may be used in the TDMA system employing this invention, the invention is not constrained to the use of such an encryption mode, and other techniques such as the cipher feedback mode or the cipher block chaining mode as described in Federal Standard 1026 may be used. Indeed, virtually any encryption/descryption technique could be used without departing from the essential nature of the invention.

The network control processor via the privacy channel has the means to send new starting states for the scrambling and descrambling circuits to each of the local stations in the TDMA networ. Depending on the degree of system-wide security desired, new starting states may be transmitted at intervals from, e.g., every five minutes to once per day. Where a high degree of security is required, short intervals between transmission of new starting states may be employed so that, by the time the unauthorized user could break the code, a new code would be implemented. This process can be totally automatic within the NCP, with the user, i.e., the overall system operator, only having to specify the interval between the sending of starting state updates to the subscribers.

The 64 bits in the privacy channel can be used to transmit the new initial scrambling sequence value (a 22-bit number) plus the necessary coordination information so that the change of such values at all local terminals in the TDMA network will occur in the same frame as seen by the satellite. This coordination is required so that no frames are lost and so that the change of initial scrambling sequence values of the scrambling and descrambling circuits is not observable by the system user.

With the configuration as described above, the unauthorized user, having been denied access to the contents of the privacy channel, must attempt to deocde the initial scrambling sequence value of the scrambler on the basis of the scrambled frame data. This process is made difficult, since (1) all channels that are scrambled either contain data of a random nature or do not occupy fixed positions in the frame, and channels which both occupy fixed positions in the frame and contain data that is not random, are not scrambled; and (2) in the TDMA system, the frame configuration is constantly changing to meet the dynamic traffic requirements. The unauthorized user having no knowledge of the present frame configuration would, therefore, find it difficult to accumulate a sufficiently large data base to allow estimation of the starting state in the period between changes of this state.

With the relatively simple configuration described above, a degree of security is provided which, although not as secure as encrypted data, is adequate for many applications and is certainly much easier and less costly to implement.

We claim:

1. For use in a Time Division Multiple Access (TDMA) communications system wherein communications signals are transmitted from and received at several stations, said communications signals being transmitted in the form of successive frames and including fixed portions which occur at respective fixed positions within each frame and non-fixed portions which do not occur at fixed positions within each frame, said fixed portions further including random portions which contain random data and non-random portions which contain non-random data, and wherein transmitted data in said communications signals is scrambled before transmission and received data in said communications signals is descrambled after reception, a data security system comprising scrambling and descrambling circuits for respectively scrambling said transmitted data and descrambling said received data, each circuit comprising a PN sequence generator for generating scrambling sequences, initial scrambling sequence value storage means, means for setting said PN sequence generator to an initial state in accordance with an initial value stored in said initial scrambling sequence value storage means, a source of data, and a mixer for mixing the data in response to the scrambling sequences, said scrambling sequences beginning at each setting of said PN sequence generator from said initial value, and wherein each said circuit includes means for changing the stored initial scrambling sequence value in said initial value storage means to a new initial scrambling sequence value which is identical for each said circuit, such that a new sequence is produced by each PN sequence generator that begins with said new initial scrambling sequence value, said system further comprising means at at least one of said stations for generating said new initial scrambling sequence value and means for transmitting said new initial scrambling sequence value in an unscrambled state to remaining ones of said stations, said data security system scrambling said non-fixed and random portions but transmitting said non-random portions in an unscrambled state.

2. The data security system in claim 1, wherein the new initial scrambling sequence value is transmitted in an encrypted form.

3. The data security system of claim 2, wherein said new initial scrambling sequence value is transmitted in a privacy channel in said frame.

4. The data security system of claim 1, wherein said communications system transmits reference signals in addition to said communications signals and wherein said means for transmitting said new initial scrambling sequence value comprises means for transmitting said new initial scrambling sequence value in said reference signals.

5. In a Time Division Multiple Access (TDMA) communications system having plural stations wherein communications signals are transmitted and received by plural stations, said communications signals being transmitted in the form of successive frames and including fixed portions which occur at respective fixed positions within each frame and non-fixed portions which do not occur at fixed positions within each frame, said fixed portions further including random portions which contain random data and non-random portions which contain non-random data, and wherein original data to be transmitted in said communications signals is scrambled at one station, and received at another station, the received scrambled data being descrambled at said another station for recovery of said original data, a data security system having scrambling and descrambling circuits at each station, said scrambling and descrambling circuits each comprising:

storage register means for receiving and storing an initial scrambling sequence value, the value of said initial scrambling sequence value at each scrambling circuit changing in synchronism with the changing of said value at each descrambling circuit;

a PN sequence generator for generating PN scrambling sequences, each PN scrambling sequence commencing from the initial scrambling sequence value presently stored in said storage register means, the PN sequence generators in each of said scrambling and descrambling circuits generating PN scrambling sequences which are the same for any given initial scrambling sequence value; and means for loading a particular initial scrambling sequence value from the storage register of each scrambling circuit into the PN sequence generator of said each scrambling circuit in synchronism with the loading of said particular initial scrambling sequence value into the PN sequence generator of each descrambling circuit;

said system further comprising means at at least one of said stations for generating a new initial scrambling sequence value, and means for transmitting said new initial scrambling sequence value in an unscrambled stated to stations other than said at least one station, said date security system scrambling said non-fixed and random portions but transmitting said non-random portions in an unscrambled state.

6. The data security system of claim 5, wherein reference signals are transmitted and received by said plural stations in addition to said communications signals, and wherein said means for transmitting said new initial scrambling sequence value comprises means for transmitting said new initial scrambling sequence value in said reference signals.

7. A method of communicating secure data in a Time Division Multiple Access (TDMA) communications system wherein communications signals are transmitted and received by plural stations in said system, said method comprising the steps of scrambling original data, transmitting said scrambled data in said communications signals, and descrambling said scrambled data to recover said original data, said scrambling and descrambling steps each comprising the steps of generating identical PN scrambling sequences from an initial scrambling sequence value and mixing the generated scrambling sequences with original and scrambled data to obtain said scrambled and original data, respectively, said generating step for both scrambling and descrambling including the steps of storing identical initial scrambling sequence values, generating a new initial scrambling sequence value at one station in said communications system, transmitting said new initial scrambling sequence value in an unscrambled state to stations in said communications system other than said one station, and replacing said stored initial scrambling sequence value with said new initial scrambling sequence value, the improvement characterized in that said communications signals are transmitted in the form of successive frames including fixed portions which occur at respective fixed positions within each frame and non-fixed portions which do not occur at fixed positions within each frame, said fixed portions further including random portions which contain random data and non-random portions which contain non-random data, and said system scrambles said non-fixed and random portions but transmits said non-random portions in an unscrambled state.

8. A method as claimed in claim 7, wherein said step of transmitting said new initial scrambling sequence value comprises the step of encrypting said new initial scrambling sequence value at said one station and transmitting the encrypted new initial scrambling sequence value to said stations other than said one station in an unscrambled state.

9. A method as claimed in claim 7, wherein reference signals are transmitted and received by said plural stations in addition to said communications signals, and wherein said step of transmitting said new initial scrambling sequence value comprises the step of transmitting said new initial scrambling sequence value in said reference signals.

* * * * *

UNITED STATES PATENT AND TRADEMARK OFFICE
CERTIFICATE OF CORRECTION

PATENT NO. : 4,811,394

DATED : March 7, 1989

INVENTOR(S) : Vivek Ragavan and William H. Wolfe

It is certified that error appears in the above-identified patent and that said Letters Patent is hereby corrected as shown below:

Column 5, line 62, delete "networ" and insert --network--.

Column 3, delete lines 25-68.

Column 4, delete lines 1-23.

Signed and Sealed this

Twenty-sixth Day of December, 1989

Attest:

JEFFREY M. SAMUELS

Attesting Officer     Acting Commissioner of Patents and Trademarks